United States Patent [19]
Ueki

[11] Patent Number: 5,095,254
[45] Date of Patent: Mar. 10, 1992

[54] DISC RECORD/REPRODUCE APPARATUS WITH BRUSHLESS MOTOR HAVING ROTATIONAL SPEED CONTROLLED BY A DISC

[75] Inventor: Yasuhiro Ueki, Sagamihara, Japan

[73] Assignee: Victor Company of Japan, Ltd., Japan

[21] Appl. No.: 650,570

[22] Filed: Feb. 5, 1991

[30] Foreign Application Priority Data

Feb. 6, 1990 [JP] Japan .................................. 2-26933
Jul. 19, 1990 [JP] Japan ................................ 2-190973

[51] Int. Cl.⁵ ............................................. H02P 6/02
[52] U.S. Cl. .................................. 318/138; 318/254; 318/710; 318/715; 318/762
[58] Field of Search ............... 318/138, 254, 439, 700, 318/710, 712, 715, 721, 724, 762, 760, 757

[56] References Cited

U.S. PATENT DOCUMENTS

| | | | |
|---|---|---|---|
| 4,814,677 | 3/1989 | Plunkett | 318/254 |
| 4,876,491 | 10/1989 | Squires et al. | 318/138 |
| 4,881,161 | 11/1989 | Thompson | 318/671 |
| 4,928,043 | 5/1990 | Plunkett | 318/721 |

FOREIGN PATENT DOCUMENTS 56-33953 8/1981 Japan .
61-3193 1/1986 Japan .
63-69489 3/1988 Japan .

Primary Examiner—William M. Shoop, Jr.
Assistant Examiner—John W. Cabeca
Attorney, Agent, or Firm—Lowe, Price, LeBlanc & Becker

[57] ABSTRACT

A disc record/reproduce apparatus with a brushless dc motor having no separate dedicated position sensor, controls rotation of the dc synchronous motor by back-electromotive force signals developed in windings of the brushless dc motor using a/d converter included in one-chip microprocessor in the first mode, and controls by position and index signals recorded on the disc in the second mode. During start-up, a start-up oscillator is used. The control with a back-electromotive force signal is provided to enable the microprocessor to write a position signal on a disc and provided for inspecting the brushless dc motor independently. In the second mode, functions for executing the back-electromotive force control in the microprocessor is disabled during recording and reproducing of data to prevent overload on the microprocessor which is busy because of communication with an external computer and control of head position.

12 Claims, 6 Drawing Sheets

DISC RECORD/REPRODUCE APPARATUS WITH BRUSHLESS MOTOR HAVING ROTATIONAL SPEED CONTROLLED BY A DISC

BACKGROUND OF THE INVENTION

1. Field of the Invention

This invention relates to a disc record/reproduce apparatus with a brushless dc motor which does not include a separately dedicated position sensor.

2. Description of the Prior Art

A disc record/reproduce apparatus is known which comprises a brushless dc motor (synchronous motor) for rotating a record disc. In such apparatus, a dc synchronous motor having no position sensor can be used wherein drive currents of windings of the dc synchronous motor are produced by switching drive transistors in response to detection of back-electromotive forces developed at windings of the dc synchronous motor during rotation of the brushless dc motor. Such brushless dc motor is disclosed in Japanese Patents Publication Nos. 56-33953 and 61-3193.

Another disc record/reproduce apparatus with a dc synchronous motor apparatus including two position detection means of the brushless dc motor for switching drive currents to rotate and to control a rotational speed is known. One position detection means is carried out by a voltage drop at a common resistor for supplying a drive current to windings during start-up of the motor. This control is switched over to the second position detection means which uses a position signal recorded on the record disc, i.e., a sector signal, because such a voltage drop cannot provide position information at a speed higher than a given value. This technique is disclosed in Japanese Patent application provisional publication 63-69489.

However, in the first mentioned prior art disc record/reproduce apparatus, generally, control of such apparatus is carried out by a microprocessor, and thus, the microprocessor becomes too busy because of execution of communication with an external computer, data processing, position control of actuator in addition to switching control of drive currents of the dc synchronous motor. Therefore, there is a drawback that an overload occurs on the processing of a microprocessor.

In the second mentioned prior art disc record/reproduce apparatus, there are drawbacks that power consumption is large because the head position should be controlled or maintained always, even in a standby mode, and the brushless dc motor cannot be inspected without the disc where the position signal has been written.

SUMMARY OF THE INVENTION

The present invention has been developed in order to remove the above-described drawbacks inherent to the conventional disc record/reproduce apparatus with a brushless dc motor.

A disc record/reproduce apparatus with a brushless dc motor having no separate dedicated position sensor, controls rotation fo the brushless dc motor by using back-electromotive force signals developed in windings of the brushless dc motor using a/d converter included in one-chip microprocessor in a first mode, and controls by position and index signals recorded on the disc in a second mode. During start-up, a start-up oscillator is used. The control with a back-electromotive force signal is provided to enable the microprocessor to write a position signal on a disc and provided for inspecting the brushless dc motor independently. In the second mode, functions for executing the back-electromotive force control in the microprocessor is disabled during recording and reproducing of data to prevent overload on the microprocessor which is busy because of communication with an external computer and control of head position.

According to the present invention there is provided a disc record/reproduce apparatus for recording/reproducing data on/from a sector of a record disc, the disc record/reproduce apparatus having a brushless dc motor for rotating the record disc, comprising: a drive circuit responsive to phase signals and an electric power for producing drive signals supplied to windings of the brushless dc motor respectively to rotate the record disc; a back-electromotive force signal producing circuit responsive to back-electromotive forces of at least two windings of the brushless dc motor for producing back-electromotive force signals; a read/write head for reading data including a second position signal recorded at every sector from the record disc, the number of the windings and the sector having a given relation therebetween; a microprocessor including: a/d-converters responsive to the back-electromotive force signals for converting the back-electromotive force signals into digital back-electromotive force signals, the back-electromotive force signal producing circuit being substantially directly connected to the windings; a first position signal detector responsive to the digital back-electromotive force signals for producing a first position signal of the brushless dc motor; a start-up clock signal producing circuit for producing a start-up clock signal; a start-up detector responsive to one of the digital back-electromotive force signals for comparing one of the digital back-electromotive force signal with a given intensity value to produce a start-up switching signal; a first switch responsive to the start-up switching signal for selecting one of the start-up clock signal or a third position signal; a phase signal producing circuit responsive to an output of the first switch for producing the phase signals; a second position signal detector responsive to the data read the record disc for detecting the second position signal; a second switch responsive to a switching signal for selecting the first position signal or the second position signal to output as the third position signal; a speed signal producing circuit responsive to the third position signal for producing a speed signal in accordance with an interval of succeeding pulses of the position signal; and a comparator for comparing the speed signal with a second given value to produce the a lock-up signal; and a controller for recording/reproducing the data in response to a record command signal including the data and to a reproduce command signal from the external computer; and for causing the a/d converters, the first position signal detector and the start-up detector to be disabled in response to the lock-up signal and then producing the switching signal to select the second position signal in order to prevent overload in processing speed of the microprocessor; and a speed controller responsive to the speed signal for controlling a speed of the brushless dc motor by controlling the electric power.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 1:
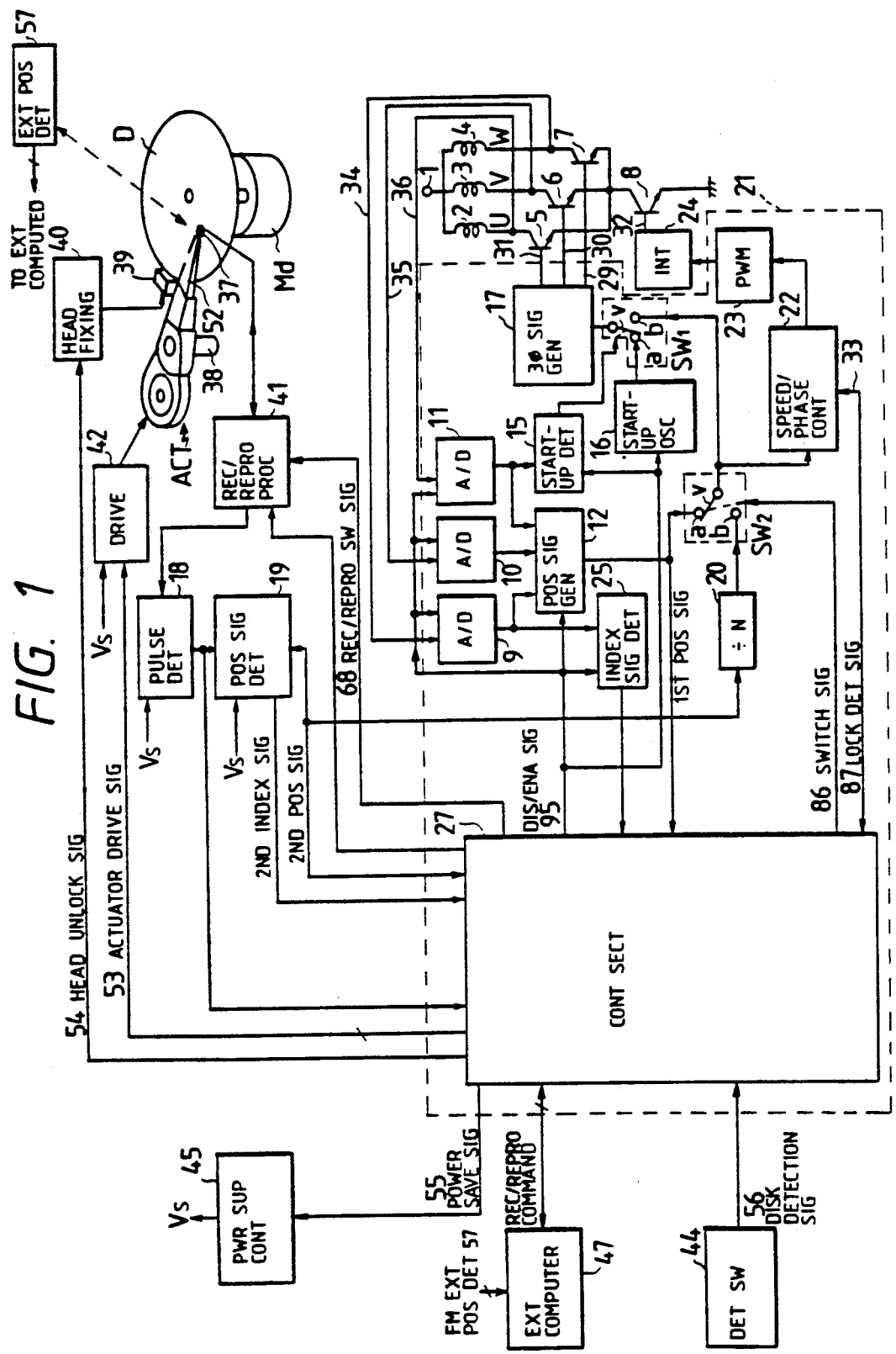
FIG. 1 is a block diagram of an embodiment of the disc record/reproduce apparatus of the invention.

Hereinbelow will be described an embodiment of this invention. FIG. 1 is a block diagram of the first embodiment of the invention of a disc record/reproduce apparatus with a brushless dc motor having no separate, dedicated position sensor.

Figure 2:
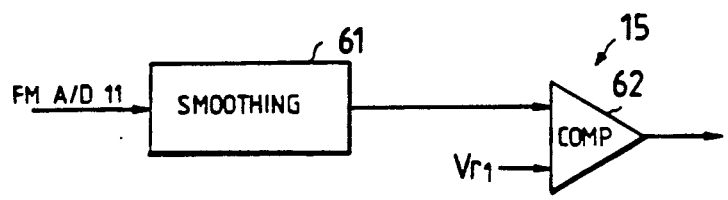
FIG. 2 is a block diagram of the start-up detection circuit of FIG. 1.

In FIG. 1, a record disc D, such as a fixed magnetic record disc, a removable magnetic record disc, or an optical record disc, is rotated by a dc synchronous motor (brushless motor or commutatorless motor) Md. Windings 2-4 are actually included in a body of the brushless dc motor Md. A common terminal 1 of the windings 2-4 is connected to a power source (not shown). Drive transistors 5-7 connected to the windings 2-4 in series respectively are driven by a three-phase drive signals respectively. Each of windings 2-4 is energized by switching the drive transistors 5-7 in response to the three-phase signal to rotate the disc D. Counter-electromotive force signals 34-36 developed at respective junction points between the windings 2-4 and the drive transistors 5-6 are sent to a/d converters 9-11 respectively. Numeral 21 denotes a microprocessor and thus, the a/d converters 9-11 are included in the microprocessor 21. Functions of elements included in the block of the microprocessor 21 are executed in accordance with a program stored in the microprocessor 21 actually. However, operations of the a/d converters 9-11, position signal generator 12, start-up oscillator, and index signal detector 25 are repeated periodically, so that it is rather easy to understand functions of these elements indicated by the blocks than by a flow chart. Accordingly, these functions are shown by means of a block diagram. On the other hand, the control section 27 performs its function not periodically, so that its function is shown by way of a flow chart shown in FIG. 11. The back-electromotive force signals 34-36 are converted into digital signals by the a/d converters 9-11. The back-electromotive force signals 34-36 a/d-converted are sent to a position signal generator 12 for generating a first position signal by detecting phase difference between these back-electromotive force signals 34-36. The first position signal of the brushless dc motor Md is sent to a three-phase signal generator 17 through switches SW1 and SW2 to generate the three-phase drive signals and is also sent to a speed/phase control circuit 22 to produce a power control signal for controlling the rotational speed and the phase difference of the brushless dc motor Md. The power control signal is sent to a base of a power control transistor 8 through a PWM (pulse-width modulation) circuit 23 and an integrator 24. An output of the a/d converter 9 is also sent to an index signal detection circuit 25 to produce a first index signal. An output of the a/d converter 11 is also sent to a start-up detection circuit 15 to detect start-up of the brushless dc motor Md. FIG. 2 is a block diagram of the start-up detection circuit 15. The start-up detection circuit 15 comprises a rectifying and smoothing circuit 61 for rectifying (taking absolute value) and smoothing the back-electromotive force signal from the a/d converter 11 and a comparator 62 for comparing an output of the rectifying and smoothing circuit 61 with a reference value $V_{r1}$ to produce a start-up switching signal. The start-up switching signal is sent to the switch SW1 for selection of an output of the switch SW2 or an output of a start-up oscillator 16. The start-up oscillator 16 produces a start-up clock for start-up of the dc synchronous motor Md because the back-electromotive force signals 34-36 are not developed during stop of the brushless dc motor Md. Therefore, when start-up, the switch SW1 transfers the start-up clock in response to the start-up switching signal and thus, the brushless dc motor Md is rotated in response to the start-up clock. After start-up, the switch SW1 is switched over to "b" position in response to the start-up switching signal and the first position signal is used for switching of the drive transistors 5-7, as shown.

The above-mentioned technique for controlling rotation of a brushless dc motor by using back-electromotive force signals is disclosed in detail in Japanese Patent publication Nos. 56-33953 and 61-3193.

The a/d converters 9-11, the position signal generator 12, the start-up detection circuit 15, the start-up oscillator 16, and the index signal detection circuit 25 further respond to a disable/enable signal 95. The disable/enable signal causes these circuits to become inoperative to prevent overload of the microprocessor 21 during communication of data with the external computer 47, data processing, and controlling of the actuator ACT. Actually, the microprocessor 21 disable interrupt by completion of a/d converting and set a flag for forbidding processing of these circuits.

An integrated circuit MC 68HC11 manufactured by Motorola Inc or $\mu$ PC 312 manufactured by NEC corporation, can be employed to the microprocessor 21. Such integrated circuit microprocessor comprises a/d converters and a PWM circuit where a/d conversion and PWM processing, and processing of the stored program are carried out in parallel. Therefore, this eliminates necessity of providing of these circuit outside the microprocessor 21, so that it reduces a manufacturing cost.

Figure 3:
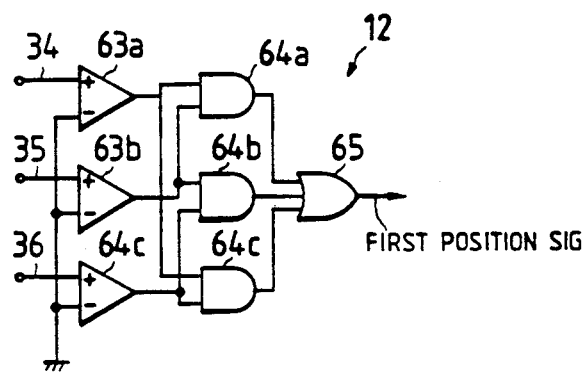
FIG. 3 is a block diagram of the position signal generator of FIG. 1.
Figure 4:
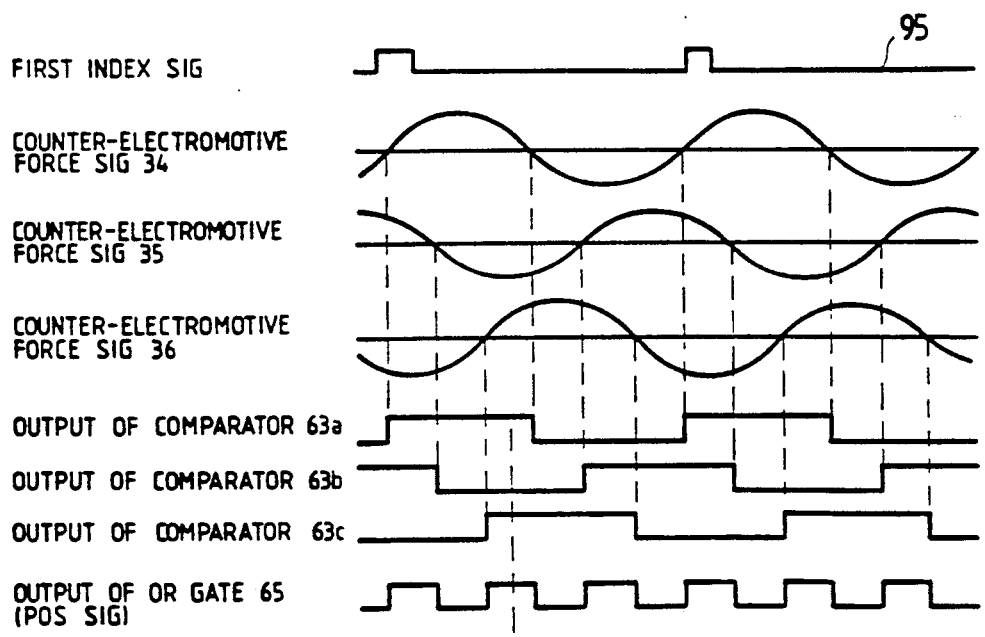
FIG. 4 shows waveforms at respective points of the position generator of FIG. 3.

FIG. 3 is a block diagram of the position signal generator 12. The position signal generator 12 comprises comparators 63a-63c responsive to the back-electromotive force signals 34-36, AND gates 64a-64c, and OR gate 65, as shown. Waveforms at respective points of the position generator are shown in FIG. 4. The index signal detection circuit 25 comprises actually a comparator (not shown) and a one-shot multivibrator (not shown) responsive to an output of this comparator. Thus, the waveform of the index signal detection circuit, i.e., the first index signal is shown by an waveform 95 in FIG. 4.

Figure 5:
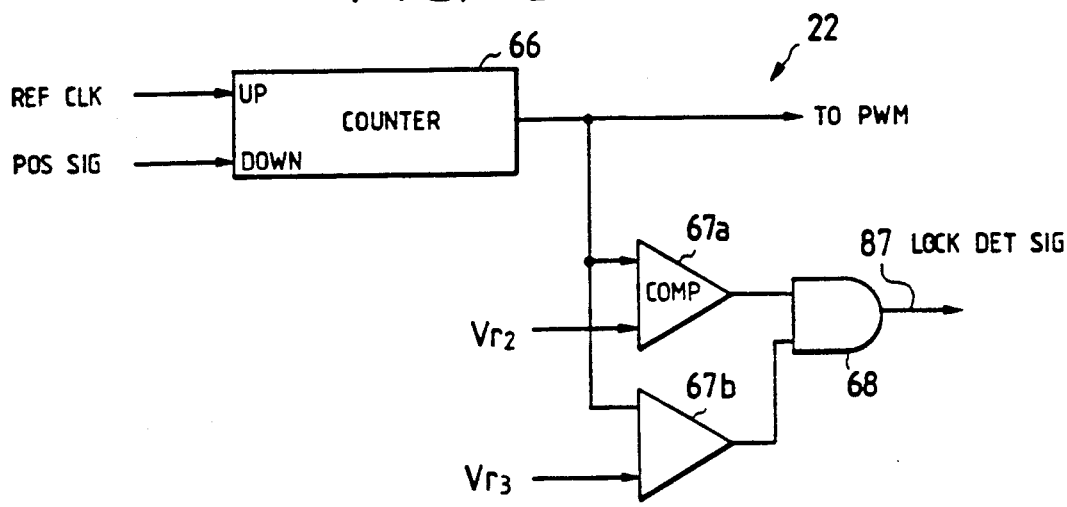
FIG. 5 is a block diagram of the speed/phase control circuit of FIG. 1.

FIG. 5 is a block diagram of the speed/phase control circuit 22. The speed/phase control circuit 22 comprises an up-down counter 66 whose up-count input responds to a reference clock and a down-count input responds to the first or second position signal. The up-down counter 66 produces the power control signal in accordance with difference between the number of the reference clock and the first position signal inputted. In other words, it produces the power control signal in accordance with an interval of succeeding pulses of the position signal repeatedly. The power control signal is also used to produce a lock detection signal 33 by two comparators 67a and 67b and an AND gate 68, which output the lock detection signal when the power control signal falls into a range between references $V_{r_2}$ and $V_{r_3}$.

The record disc D is rotated by the dc synchronous motor Md and read by the read/write head 37. The read/write head 37 sends a read signal to a record/reproduce processing circuit 41 whose operation mode is changed by a record/reproduce switch signal 68 into record or reproduce mode. The read signal is amplified in the record/reproduce processing circuit 41 and then sent to a pulse detection circuit 18 for detecting a recorded pulse signal. The recorded pulse signal is sent to the control section 27 and to a position signal detection circuit 19.

Figure 6:
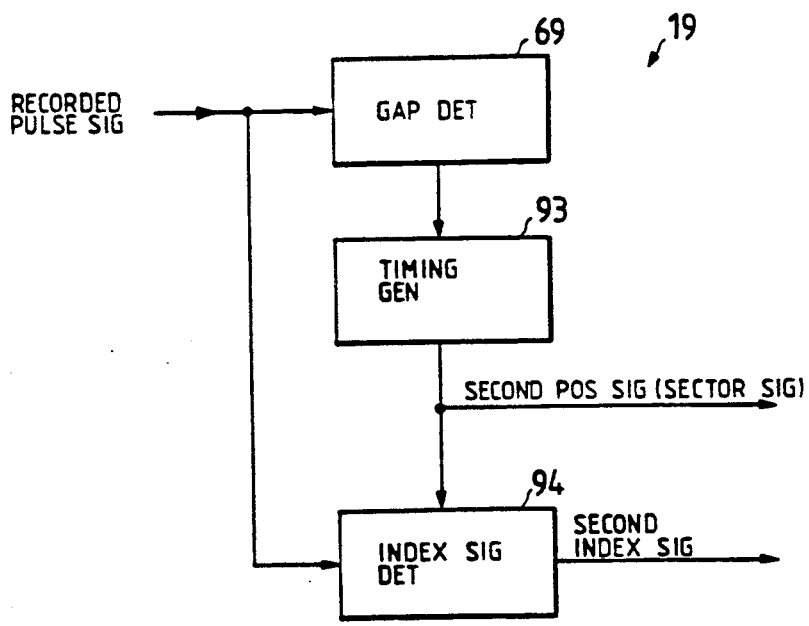
FIG. 6 is a block diagram of the position signal detection circuit of FIG. 1.
Figure 7:
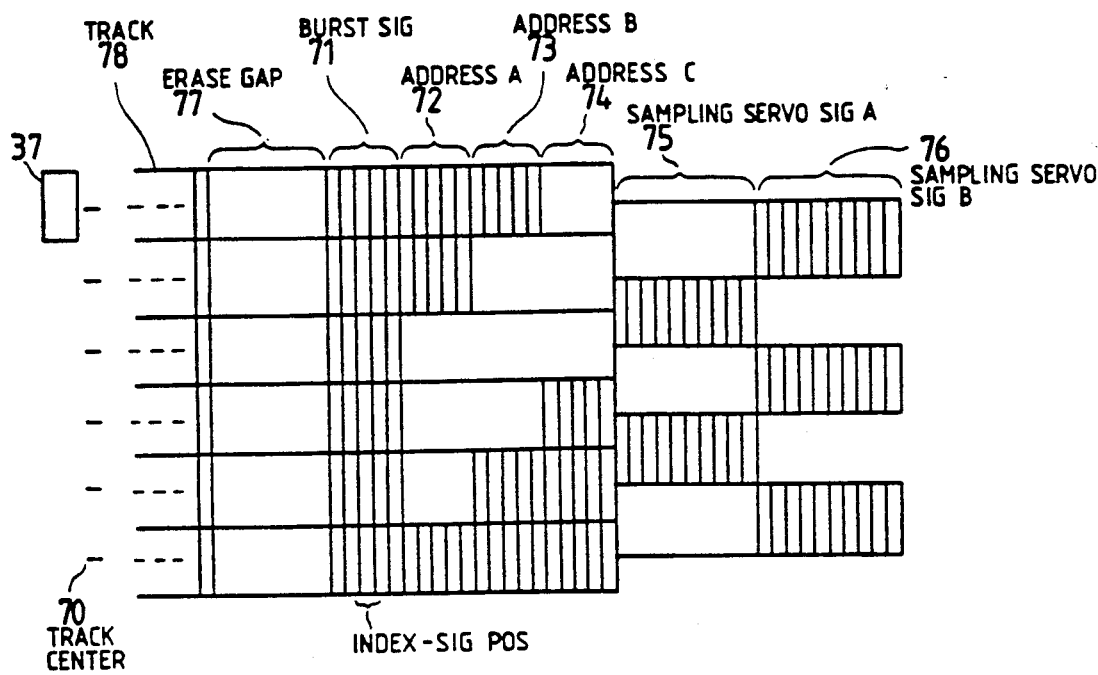
FIG. 7 shows patterns of recorded pulses at top of a sector of this embodiment.
Figure 8:
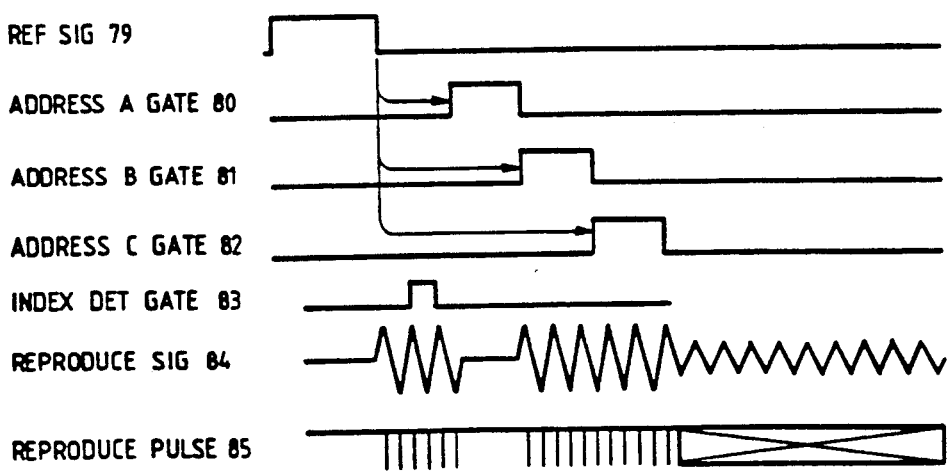
FIG. 8 shows a timing chart of the signals shown in FIG. 7.

FIG. 6 is a block diagram of the position signal detection circuit 19. In FIG. 6, the recorded pulse signal is applied to a gap detection circuit 69 and to an index signal detection circuit 94. The gap detection circuit 69 detects an erase gap disposed at a top of a sector. FIG. 7 shows patterns of recorded pulses at top of a sector. In FIG. 7, the read/write head 37 traces a track 78 and detects no pulse at erase gap 77 because no pulse is recorded for a period longer than a given interval at the erase gap 77. At the following period, a burst signal 71 is recorded where an index signal is recorded at every one rotation of the record disc D by erasing middle two waves in the burst signal 71. At the following three periods, addresses A, B and, C representing track number are recorded. At the following two periods, servo signals A and B are recorded for tracking servo control. FIG. 8 shows a timing chart of these signals. The index signal is detected by using an index detection gate signal 83. In FIG. 6, the gap detection circuit 69 detects the erase gap by detecting no pulse for a period longer than the given period to produce a gap detection signal. The gap detection signal is sent to a timing generator 93 for producing the index detection gate signal 83 which is also used as a second position signal. The index detection gate signal 83 is sent to the index detection circuit 94 for detecting a second index signal out of the recorded pulse signal. The second index signal is sent to the control section 27. The second position signal is sent to the control section 27 and to a pulse-count divider 20 for dividing the second position signal by a natural number N which is so selected that the number of sectors per round track divided by N equals th number of the first position signal of the brushless dc motor Md. The divided second position signal is sent to the switch SW2. The switch SW2 is changed over in response to a switch signal 86 from a first control mode to a second control mode in the presence of the lock detection signal, i.e., from contact position "a" to "b". When the control section 27 receives the lock detection signal 87, it produces the switch signal 86 for controlling the brushless dc motor Md through a control loop of the brushless dc motor Md, disc D, read/write head 37, position signal detection circuit 19, divider 20, three phase signal generator 17, and drive transistors 5-7.

The control section 27 produces the record/reproduce switching signal 68, the record signal, read data signal, the switch signal 86, an actuator drive signal 53, and head fixing signal 54 in response to record or reproduce command from an external computer 47, disc detection signal 56, lock detection signal 87, second index signal, second position signal, and read recorded pulse signal.

Figure 9:
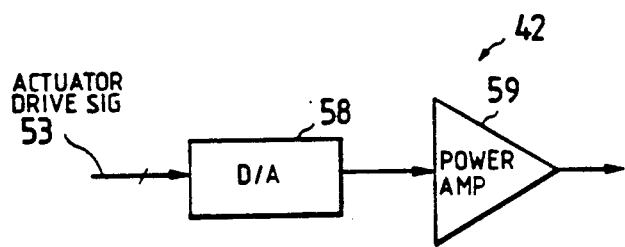
FIG. 9 is a block diagram of the actuator drive circuit of FIG. 1.

When the external computer 47 sends a reproduce command including a desired sector number to the control section 47, the control section 27 produces the record/reproduce switch signal 68 to change the mode of the record/reproduce processing circuit 41 into the reproduce mode and produces an actuator drive signal 53 to change a position of the read/write head 37 by an actuator ACT through an actuator drive circuit 42. Then, the control section 27 receives data read by the read/write head 37 through the record/reproduce processing circuit 41 and the pulse detection circuit 18. The position of the read/write head 37 is controlled by detection of the sector number recorded at the addresses A, B, and C, and sampling serve signals A and B and by production of the actuator drive signal 53. FIG. 9 is a block diagram of the actuator drive circuit 42. The actuator drive circuit 42 comprise a D/A converter 58 responsive to the actuator drive signal 53 and a power amplifier 59 responsive the D/A converter 58. The actuator ACT may comprise a voice coil. Accurate positioning of the read/write head 37 is controlled by detection of the sampling servo signals A and B recorded at addresses C and D respectively. This accurate controlling of the head position with the sampling servo signals A and B is a well-known technique.

When the external computer 47 sends a record command including a desired sector number and data to be written at a sector indicated by the sector number, to the control section 27, the control section 27 produces the record/reproduce switch signal 68 to change the mode of the record/reproduce processing circuit 41 into the record mode and sends the data from the external computer 47 to the record/reproduce processing circuit 41 to record the data through the read/write head 37. The position of the read/write head 37 is controlled by detection of the sector number recorded at the addresses A, B, and C and production of the actuator drive signal 53. Accurate positioning of the read/write head 37 is controlled by detection of the sampling servo signals A and B recorded at addresses C and D respectively.

This apparatus further comprises a power save function for saving power consumption. If the apparatus receives no reproduce or record command from the external computer 47 for a given interval, it enters a power saving mode. If the control section 27 detects the absence of the reproduce or record command from the external computer 47 for the given interval, it sends a power save signal 55 to a power supply control circuit 45. The power supply control circuit 45 supplies the supply voltage Vs to the drive circuit 42, the pulse detector 18, and the position signal detector 19 to cut off the supply voltage Vs in response to the power save signal 55.

Before cut off of the supply voltage Vs, the control section 27 produces the actuator drive signal to move the arm 52 at a predetermined position above a head fixing device. The head fixing device 39 fixes the arm 52.

Figure 10:
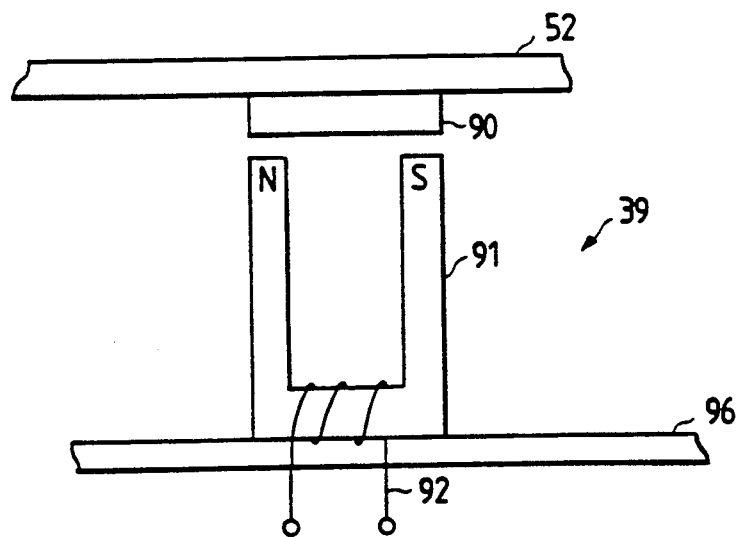
FIG. 10 is a plan view of the head fixing device of FIG. 1.

FIG. 10 is a plan view of the head fixing device 39. The head fixing device 39 comprises a permanent magnet 91 fixed on a chassis 96, a coil 92, and iron plate 90 fixed on the head arm 52. When the control section 27 decides to operate in a power saving mode it positions the read/write head 37 so that the iron plate 90 moves above the magnet 91 to be attracted and fixed by the permanent magnet 91. When the control section receives the record or reproduce command from the external computer 47, it produces the head unlock signal 54.

In response to this, the head fixing drive circuit 40 produces the drive signal to energize the coil 92 to produce a magnetism which cancels a magnetism of the permanent magnet 91. Therefore, the iron plate 90 is released from the magnet 91. Then, the control section produces the actuator drive signal 53 to move the arm 52. Because the drive signal of the coil 92 is produced only during releasing of the iron plate 90 from the magnet 91, power consumption is saved. In addition to this, the power consumption at the drive circuit 42 for controlling the head position is saved during fixing of the arm 52 by the head fixing device 39 because the magnet 91 is a permanent magnet. Contrary to this, a permanent magnet may be fixed on the arm and the magnetic plate 90 fixed on the chassis 96 of the apparatus.

Figure 11:
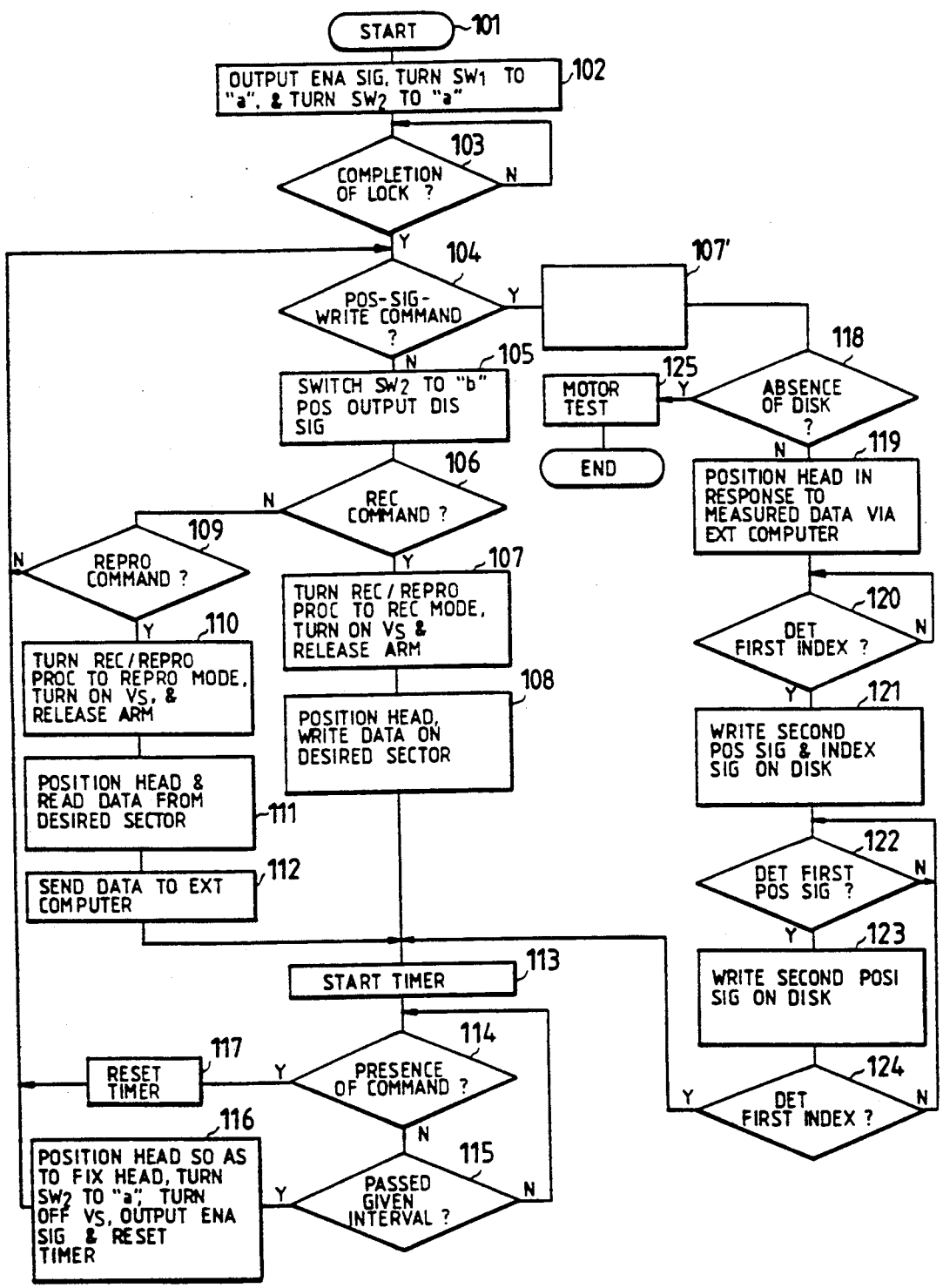
FIG. 11 shows a flow chart of this embodiment.

The above-mentioned operation of the control section 27 is executed by the microprocessor 21 in accordance with the flow chart of FIG. 11. In FIG. 11, processing starts at step 101 after turn-on of the apparatus. In step 102, the control section 27 turns the disable/enable signal to an enable state and turns the switches $SW_1$, and $SW_2$ to "a" positions respectively, as shown. In the following step 103, the control section 27 makes a decision as to whether lock of the rotation speed of the brushless dc motor Md is detected by checking the lock detection signal 87 from the speed/phase control circuit 22. Processing loops in step 103 until completion of lock of the dc synchronous motor Md. When lock of the brushless dc motor Md is detected, processing proceeds to step 104. In step 104, the control section 27 makes a decision as to whether received command from the external computer 47 is a position-signal-write command. If NO, processing proceeds to step 105. In step 105, the control section 27 turns the switch $SW_2$ to "b" position to control the speed of the brushless dc motor Md using the second position signal recorded on the disc D. In the following step 106, the control section 27 makes a decision as to whether the received command is the record command. If YES, the control section 27 turns the record/reproduce processing circuit to the record mode, turns the supply voltage Vs on, and release the arm from the head fixing device 39 in step 107. In the following step 108, the control section 27 positions the read/write head 37 at a desired track and writes data included in the record command in response to the index signal, the second position signal, and the sector number recorded at addresses A, B, and C. Then, processing proceeds to step 113.

In step 106, if the answer is NO, processing proceeds to step 109. The control section 27 makes a decision as to whether the received command is a reproduce command in step 109. If NO, processing returns to step 104.

If YES, processing proceeds to step 110. In step 110, the control section 27 turns the record/reproduce processing circuit to the reproduce mode, turns the supply voltage Vs on, and release the arm from the head fixing device 39. In the following step, the control section 27 positions the read/write head 37 at a desired track and read data from the disc D in response to the index signal, second position signal, and the sector number recorded at addresses A, B, and C. In the succeeding step 112, the control section 27 sends the read data to the external computer 47. Then, processing proceeds to step 113.

Hereinbelow will be described operation of recording the second position signal and the second index signal. In step 104, the control section 27 made a decision as to whether received command from the external computer 47 is a position-signal-write command. When the answer is YES, the processing proceeds to step 107'. In step 107', the control section 27 turns the record/reproduce processing circuit to the record mode, turns the supply voltage Vs on, and releases the arm from the head fixing device 39. In the following step 118, the control section 27 makes a decision as to whether the disc D is absent from a rotating shaft of the brushless dc motor Md on the basis of a disk detection signal 56 from a detection switch 44. If YES, processing proceeds to step 125. If NO, processing proceeds to step 119. In step 119, the control section 27 positions the read/write head 37 by producing the actuator drive signal 53 in response to the measured data by an external position detection apparatus 57 shown in FIG. 1, such as a laser interferometer, the measured data is sent to the control section 27 via the external computer 47. The external position detection apparatus 57 produces position data of the read/write head 37 in radial direction of the disc D and sends the measured data to the external computer 47. The external computer sends a position command to the control section 27. In the following step 120, a decision is made as to whether the first index signal is detected. If YES, in the following step 121, the control section 27 writes the second position signal and the second signal on the disc D. Actually, the control section 27 produces the erase gap 77 and erases the middle two waves in the burst signal 71, as shown in FIG. 7. In the following step 121, the control section 27 waits until detection of the first position signal. If the first position signal is detected in step 122 the control section 27 writes the second position signal on the disc D by producing the erase gap 77 in step 123. Processing of steps 122 and 123 is continued until the first index signal is detected in step 124 again. If the first index signal is detected processing proceeds to step 113.

In step 125, a running test of the dc synchronous motor Md can be carried out by the back-electromotive force signals 34-36. Generally, these steps 107' to 125 are executed only in the manufacturing process of this apparatus.

Hereinbelow will be described the power saving operation. Processing from step 108, 112, and 124 proceeds to step 113, In step 113, the control section 27 starts a timer included in the microprocessor 21. In the following step 114, a decision is made as to whether a command from the external computer 47 is present. If the command from the external computer 47 is present, processing returns to step 104 through step 117 where the timer is reset. If the command from the external computer 47 is absent, the processing proceeds to step 115. In the step 115, a decision is made as to whether a given interval set to the timer has passed. If the given interval has passed, processing proceeds to step 116. In step 116, the control section 27 position the read/write head 37 above the head fixing device 39 to fix the read/write head 37. Then, control section 27 turns the switch $SW_2$ to "a" position, turns the supply voltage Vs off, turns the disable/enable signal to an enable state, and reset the timer. Processing returns to step 104. In steps 113-117, if the record or reproduce command is absent for the given interval, the supply voltage Vs is turned off after fixing the read/write head 37.

What is claimed is:

1. A disc record/reproduce apparatus for recording/reproducing data on/from a sector of a record disc, said disc record/reproduce apparatus having a brushless dc motor for rotating said record disc, said brushless dc motor having a plurality of windings, comprising:
   (a) drive means responsive to phase signals and an electric power for producing drive signals supplied to the windings of said brushless dc motor respectively to rotate said record disc;
   (b) back-electromotive force signal producing means responsive to back-electromotive forces of at least two of said windings of said brushless dc motor for producing back-electromotive force signals;
   (c) read/write head means for reading data including a second position signal recorded at every sector from said record disc, the number of said windings and said sector having a given relation therebetween;
   (d) microprocessor means including:
      (I) a/d-converting means responsive to said back-electromotive force signals for converting said back-electromotive force signals into digital back-electromotive force signals;
      (II) first position signal detecting means responsive to said digital back-electromotive force signals for producing a first position signal of said brushless dc motor;
      (III) start-up clock signal producing means for producing a start-up clock signal;
      (IV) start-up detection means responsive to one of said digital back-electromotive force signals for comparing one of said digital back-electromotive force signals with a given intensity value to produce a start-up switching signal;
      (V) first switching means responsive to said start-up switching signal for selecting between said start-up clock signal and a third position signal;
      (VI) phase signal producing means responsive to an output of said first switching means for producing said phase signals;
      (VII) second position signal detecting means responsive to said data read from said record disc for detecting said second position signal;
      (VIII) second switching means responsive to a second switching signal for selecting between said first position signal and said second position signal to output as said third position signal;
      (IX) speed signal producing means responsive to said third position signal for producing a speed signal in accordance with an interval of succeeding pulses of said third position signal;
      (X) comparing means for comparing said speed signal with a second given value to produce a lock-up signal;
      (XI) control means for recording/reproducing said data in response to a record command signal including said data and to a reproduce command signal from an external computer; and for causing said a/d-converting means, said first position signal detection means, and said start-up detection means to be disabled in response to said lock-up signal and then producing said second switching signal to select said second position signal as said third position signal in order to prevent overload in processing speed of said microprocessor means; and
   (e) speed control means responsive to said speed signal for controlling a speed of said brushless dc motor by controlling said electric power.

2. A disc record/reproduce apparatus as claimed in claim 1, further comprising:
   disc detection means responsive to the presence of said disc at a given position for producing a disc detection signal;
   wherein said control means is further responsive to said disc detection signal for producing said second switching signal to cause said second switching means to output said first position signal as said third position signal in the absence of said record disc.

3. A disc record/reproduce apparatus as claimed in claim 1, further comprising:
   (a) head positioning means responsive to a positioning signal for positioning said read/write head at a desired track by moving an arm to which said read/write head is provided;
   (b) head fixing means having:
      a permanent magnet fixed on a chassis of said disc record/reproduce apparatus; and
      a magnetic plate fixed on said arm; said permanent magnet fixing said read/write head at given position in response to access of said magnetic plate thereto; and
   (c) power supply control means responsive to a power save signal for cutting off power supply to said head positioning means;
   wherein said control means produces said second switching signal to select said first position and produces said power save signal and then produces said positioning signal to cause said positioning means to position said read/write head such that said permanent magnet attracts said magnetic plate, in order to save electric power consumption at said head positioning means.

4. A disc record/reproduce apparatus as claimed in claim 3, further comprising:
   pulse detection means responsive to an output of said read/write head and said power supply for producing a pulse signal indicative of said data and for sending it to said control means in the presence of said power supply; wherein said second position signal detection means further responds to said power supply to save electric power consumption thereof.

5. A disc record/reproduce apparatus as claimed in claim 1, further comprising:
   (a) first index signal detection means responsive to one of said digital back-electromotive force signals for producing a first index signal; and (b) second index signal detection means responsive to said data read from said record disc for detecting a second index signal included in said data at every rotation of said record disc;

wherein said control means, in response to a position-signal-write command from said external computer, produces said second switching signal to cause said second switching means to select said first position signal as said third position signal, produces a position-signal write signal to write said second position signal on said record disc in response to said first position signal, and produces an index-signal write signal to write said second index signal on said record disc in response to said first index signal.

6. A disc record/reproduce apparatus as claimed in claim 1, further comprising:
   (a) head positioning means responsive to a positioning signal for positioning said read/write head at a desired track by moving an arm to which said read/write head is provided:
   (b) head fixing means having:
       a permanent magnet fixed on said arm; and
       a magnetic plate fixed on a chassis of said disc record/reproduce apparatus;
       said permanent magnet fixing said read/write head at given position in response to access of said magnetic plate thereto; and
   (c) power supply control means responsive to a power save signal for cutting off power supply to said head positioning means;
   wherein said control means produces said second switching signal to select said first position and produces said power save signal and then produces said positioning signal to cause said positioning means to position said read/write head such that said permanent magnet attracts said magnetic plate, in order to save electric power consumption at said head positioning means.

7. A disc record/reproduce apparatus as claimed in claim 6, further comprising:
   pulse detection means responsive to an output of said read/write head and said power supply for producing a pulse signal indicative of said data read from said record disc and for sending it to said control means in the presence of said power supply; wherein said second position signal detection means further responds to said power supply to save electric power consumption thereof.

8. A disc record/reproduce apparatus for recording/reproducing data on/from a sector of a record disc, said disc record/reproduce apparatus having a brushless dc motor for rotating said record disc, said brushless dc motor having a plurality of windings, comprising:
   (a) drive means responsive to phase signals and an electric power for producing drive signals supplied to the windings of said brushless dc motor respectively to rotate said record disc;
   (b) back-electromotive force signal producing means responsive to back-electromotive forces of at least two windings of said brushless dc motor for producing back-electromotive force signals, said back-electromotive force signal producing means being substantially directly connected to said winding;
   (c) read/write head means for reading data including a second position signal recorded at every sector from said record disc, the number of said windings and said sector having a given relation therebetween;
   (d) first position signal detecting means responsive to said back-electromotive force signals for producing a first position signal of said brushless dc motor;
   (e) start-up clock signal producing means for producing a start-up clock signal;
   (f) start-up detection means responsive to one of said back-electromotive force signals for comparing one of said back-electromotive force signal with a given intensity value to produce a start-up switching signal;
   (g) first switching means responsive to said start-up switching signal for selecting one of said start-up clock signal and a third position signal;
   (h) phase signal producing means responsive to an output of said first switching means for producing said phase signals;
   (i) second position signal detecting means responsive to said data read from said record disc for detecting said second position signal;
   (j) second switching means responsive to a second switching signal for selecting one of said first position signal and said second position signal to output as said third position signal;
   (k) speed signal producing means responsive to said third position signal for producing a speed signal in accordance with an interval of succeeding pulses of said position signal;
   (l) comparing means for comparing said speed signal with a second given value to produce a lock-up signal;
   (m) control means for producing said second switching signal to select said second position signal as said third position signal in response to said lock-up signal; and
   (n) speed control means responsive to said speed signal for controlling a speed of said brushless dc motor by controlling said electric power.

9. A disc record/reproduce apparatus as claimed in claim 8, further comprising:
   (a) command detection means responsive to an external computer for detecting whether a command from said external computer is absent for a given interval;
   (b) head positioning means responsive to a positioning signal for positioning said read/write head at a desired position by moving an arm to which said read/write head is provided;
   (c) head fixing means having:
       a permanent magnet fixed on a chassis of said disc reproduce apparatus; and
       a magnetic plate fixed on said arm;
       said permanent magnet fixing said read head at a given position in response to access of said magnetic plate thereto; and
   (d) power supply control means responsive to a power save signal for cutting off power supply to at least a portion of said head positioning means and to said second speed signal producing means;
   wherein said control means produces said second switching signal to select said first position signal as said third position signal and produces said power save signal and then produces said positioning signal to cause said head positioning means to position said read/write head such that said permanent magnet attracts said magnetic plate, in order to save electric power consumption at said head positioning means.

10. A disc record/reproduce apparatus as claimed in claim 8, further comprising:
   (a) first index signal detection means responsive to one of said digital back-electromotive force signals for producing a first index signal; and
   (b) second index signal detection means responsive to said data read from said record disc for detecting a second index signal included in said data at every rotation of said record disc;
   wherein said control means, in response to a position-signal-write command from an external computer, produces said second switching signal to cause said switching means to select said first position signal as said third position signal, produces a position-signal write signal to write said second position signal on said record disc in response to said first position signal, and produces an index-signal write signal to write said second index signal on said record disc in response to said first index signal.

11. A disc record/reproduce apparatus as claimed in claim 8, further comprising a/d converting means responsive to said back-electromotive force signals for converting said back-electromotive force signals into digital signals, said back-electromotive force signals being produced substantially directly by the windings of said brushless dc motor, said a/d converting means being substantially directly connected to said windings.

12. A disc record/reproduce apparatus as claimed in claim 10, wherein said control means operates to cause said a/d-converting means, said first position signal detection means, and said start-up detection means to be disabled in response to said lock-up signal in order to prevent overload in processing speed of said microprocessor means.

* * * * *